United States Patent
Pramod et al.

(10) Patent No.: US 12,418,255 B2
(45) Date of Patent: Sep. 16, 2025

(54) IDENTIFICATION OF CURRENT GAIN ERRORS AND RESISTANCE IMBALANCE IN FEEDBACK CURRENT-CONTROLLED SYNCHRONOUS MOTOR DRIVE SYSTEMS

(71) Applicant: Steering Solutions IP Holding Corporation, Saginaw, MI (US)

(72) Inventors: Prerit Pramod, Bellevue, WA (US); Krishna M P K Namburi, Auburn Hills, MI (US); Prathima Nuli, Auburn Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 162 days.

(21) Appl. No.: 18/484,275

(22) Filed: Oct. 10, 2023

(65) Prior Publication Data

US 2025/0119081 A1    Apr. 10, 2025

(51) Int. Cl.
*H02P 21/13*    (2006.01)
*H02P 21/22*    (2016.01)

(52) U.S. Cl.
CPC .............. *H02P 21/13* (2013.01); *H02P 21/22* (2016.02); *H02P 2207/05* (2013.01)

(58) Field of Classification Search
CPC ....... H02P 21/13; H02P 21/22; H02P 2207/05
USPC .............................. 318/400.02, 400.01, 700
See application file for complete search history.

(56) References Cited

U.S. PATENT DOCUMENTS

| | | | |
|---|---|---|---|
| 9,077,278 B2* | 7/2015 | Omata | ............... H02P 21/22 |
| 11,171,595 B2 | 11/2021 | Pramod | |
| 11,283,391 B2 | 3/2022 | Pramod et al. | |
| 11,349,416 B2 | 5/2022 | Pramod | |
| 11,804,799 B2 | 10/2023 | Pramod et al. | |

OTHER PUBLICATIONS

Pramod, Prerit. "Analytical Modeling of Parameter Imbalance in Permanent Magnet Synchronous Machines." arXiv preprint arXiv:2310.00508 (Sep. 30, 2023).

* cited by examiner

*Primary Examiner* — David Luo
(74) *Attorney, Agent, or Firm* — Dickinson Wright PLLC

(57) ABSTRACT

A method for detecting and distinguishing a current measurement gain error and a resistance imbalance in a motor drive system includes: determining a first voltage command signal, a first motor position signal, and a first quadrature-axis current command when the motor is rotating at a first speed; computing, based on the first voltage command and motor position signals, a first demodulated voltage signal; determining a second voltage command signal, a second motor position signal, and a second quadrature-axis current command while the motor is rotating at a second speed that is different than the first speed; computing, based on the second voltage command and the motor position signals, a second demodulated voltage signal; and computing a resistance imbalance flag indicating a resistance imbalance and a current gain error flag indicating a current sensing gain error.

20 Claims, 4 Drawing Sheets

IDENTIFICATION OF CURRENT GAIN ERRORS AND RESISTANCE IMBALANCE IN FEEDBACK CURRENT-CONTROLLED SYNCHRONOUS MOTOR DRIVE SYSTEMS

TECHNICAL FIELD

This disclosure relates to electric motor drives and in particular to detecting and distinguishing between current measurement scaling errors and resistance imbalance in a synchronous motor drive system operating under feedback current control.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, a hydraulic steering system, or other suitable steering system. The steering system and/or other features of the vehicle may include one or more electric motors. Such electric motors may comprise synchronous motors, such as permanent magnet synchronous motors (PMSM).

Safety-critical, high performance and fault-tolerant applications employing PMSM drives such as electric steering and automotive traction, to name a few, require intelligent diagnostic algorithms that can, in addition to detect issues in different parts of the motor drive system, be able to differentiate between different non-idealities or failures that may have similar signatures.

Synchronous machines under feedback current control operation produce current and voltage harmonics at twice the synchronous frequency in response to interphase resistance imbalance and current sensor gain (scaling) errors. The similarity of the signatures of both these non-idealities creates difficulty in developing algorithms that utilize different signals for detecting the presence of or distinguishing between either of the two issues particularly when they both occur simultaneously.

SUMMARY OF THE INVENTION

This disclosure relates generally to control of electric motors.

An aspect of the disclosed embodiments includes a method for detecting and distinguishing a current measurement gain error and a resistance imbalance in a motor drive system. The method includes: determining, for a motor, a first voltage command signal, a first motor position signal, and a first quadrature-axis current command when the motor is rotating at a first speed; computing, based on the first voltage command signal and the first motor position signal, a first demodulated voltage signal; determining a second voltage command signal, a second motor position signal, and a second quadrature-axis current command when the motor is rotating at a second speed that is different from the first speed; computing, based on the second voltage command signal and the second motor position signal, a second demodulated voltage signal; and computing, based on the first demodulated voltage signal, the second demodulated voltage signal, the first quadrature-axis current command, and the second quadrature-axis current command, each of a resistance imbalance flag and a current gain error flag. The resistance imbalance flag has a non-zero value in response to a resistance imbalance in the motor and is unaffected by a current sensing gain error. The current gain error flag has a non-zero value in response to a current sensing gain error and is unaffected by a resistance imbalance in the motor.

Another aspect of the disclosed embodiments includes an electronic controller. The electronic controller includes a processor and a memory. The memory includes instructions that, when executed by the processor, cause the processor to: determine, for a motor, a first voltage command signal, a first motor position signal, and a first quadrature-axis current command when the motor is rotating at a first speed; compute, based on the first voltage command signal and the first motor position signal, a first demodulated voltage signal; determine a second voltage command signal, a second motor position signal, and a second quadrature-axis current command when the motor is rotating at a second speed that is different from the first speed; compute, based on the second voltage command signal and the second motor position signal, a second demodulated voltage signal; and compute, based on the first demodulated voltage signal, the second demodulated voltage signal, the first quadrature-axis current command, and the second quadrature-axis current command, each of a resistance imbalance flag and a current gain error flag. The resistance imbalance flag has a non-zero value in response to a resistance imbalance in the motor and is unaffected by a current sensing gain error. The current gain error flag has a non-zero value in response to a current sensing gain error and is unaffected by a resistance imbalance in the motor.

Another aspect of the disclosed embodiments includes a system for detecting and distinguishing a current measurement gain error and a resistance imbalance in a motor drive system. The system includes: a controller configured to: determine, for a motor, a first voltage command signal, a first motor position signal, and a first quadrature-axis current command when the motor is rotating at a first speed; compute, based on the first voltage command signal and the first motor position signal, a first demodulated voltage signal; determine a second voltage command signal, a second motor position signal, and a second quadrature-axis current command when the motor is rotating at a second speed that is different from the first speed; compute, based on the second voltage command signal and the second motor position signal, a second demodulated voltage signal; and compute, based on the first demodulated voltage signal, the second demodulated voltage signal, the first quadrature-axis current command, and the second quadrature-axis current command, each of a resistance imbalance flag and a current gain error flag. The resistance imbalance flag has a non-zero value in response to a resistance imbalance in the motor and is unaffected by a current sensing gain error. The current gain error flag has a non-zero value in response to a current sensing gain error and is unaffected by a resistance imbalance in the motor.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure uses a ∧(hat) to indicate estimated parameters, an * (asterisk) to indicate a command parameter, and a −(overbar) to indicate a vector parameter.

The present disclosure provides a detailed mathematical model for synchronous motor drives considering both issues simultaneously and explains specific effects of each issue and their relative dominance on the signals in different operating ranges, in order to enable identifying and segregating them. The present disclosure also provides a strategy to distinguish between different types of errors (current gain/resistance imbalance/both) throughout a range of operating conditions.

The present disclosure provides an algorithm which detects the presence of resistance imbalance and/or current measurement gain errors during the run time in the vehicle. The systems and methods of the present disclosure can serve as a diagnostic to take necessary action after the detection of the error, such as generating a corresponding error message, and/or utilizing a fallback or redundant set of motor windings and/or current sensors, depending on the type of error that is identified.

Figure 1:
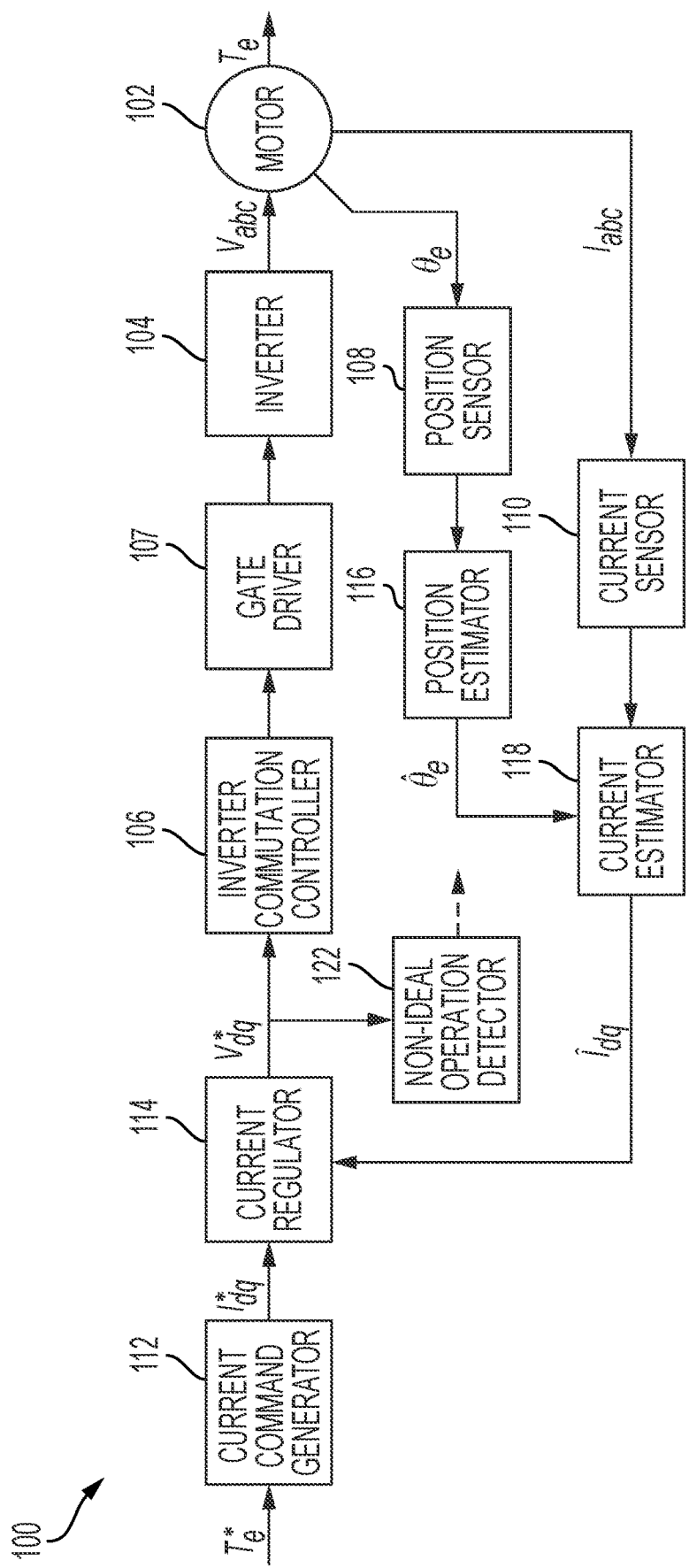
FIG. 1 generally illustrates an electric motor drive system under feedback current control with a non-ideal operation detector, according to principles of the present disclosure.

FIG. 1 generally illustrates a synchronous motor drive system 100 with feedback current control, according to principles of the present disclosure. The system 100 may include a current command generator 112, a current regulator 114, a commutation controller 106, a gate driver 107, an inverter 104, a motor 102, a current sensor 110, a current estimator 118, a position estimator 116, and a position sensor 108.

In some embodiments, the current regulator 114, the commutation controller 106, the gate driver 107, the inverter 104, the motor 102, the current sensor 110, and the current estimator 118 form a closed-loop current control system. It should be noted that fewer or more components may be included in the system 100 as desired to perform the techniques disclosed herein and the components depicted are for explanatory purposes.

In some embodiments, the synchronous motor drive system 100 may function as follows. The current regulator 114 receives a command or reference current and outputs a corresponding voltage command signal. The position sensor 108 may be configured to sense a position of the motor 102. The position sensor 108 may communicate the sensed position to the position estimator 116. The position estimator 116 may estimate one or more positions of the motor 102 based on the position sensed by the position sensor 108.

With the foregoing described, additional details and operation of the system 100 will now be discussed. The motor 102 may generate rotational or linear force used to power a machine, such as those described herein. The motor 102 may include a synchronous motor, such as a PMSM or other suitable motor. The system 100 may selectively control electrical energy provided to the motor 102. The system 100 may provide the electrical energy to the motor 102 in varying amounts and at varying frequencies, thereby indirectly controlling the speed and torque of the motor 102.

The current sensor 110 may include any suitable current sensor configured to sense or measure an electric current in a circuit. The current sensor 110 may provide signals indicating the current to the current estimator 118. The current sensor 110 may be configured to receive the signals indicating the current and to measure the amount of current output by the motor 102 (e.g., based on the current indicated by the signals). The current estimator 118 may be configured to either transmit the stationary frame currents of the motor 102 or transform the measured current using a position estimate from the position estimator 116 of the motor 102 into a synchronous reference frame.

The current command generator 112 may receive a torque command $T_e^*$. The current command generator 112 may generate a commanded current $I_{dq}^*$ based on the torque command. The current command $\bar{I}^*$ may be composed of a direct axis (direct-axis) $I_d^*$ and a quadrature axis (quadrature-axis) $I_q^*$ current component. The current regulator 114 receives the commanded current and transmits a voltage command signal $V_{dq}^*$ to the commutation controller 106. The voltage command $\bar{V}^*$ may be composed of a direct-axis component $V_d^*$ and a quadrature-axis component $V_q^*$. The commutation controller 106 may control a proportion of time the output voltage signal is high compared to when it is low over a consistent period of time, which may control a direction and speed of the motor 102. The gate driver 107 receives one or more signals from the commutation controller 106, and uses those one or more signals to control a conductive state of one or more switches within the inverter 104. The inverter 104 may include a voltage source inverter or other suitable inverter and may be configured to vary the frequency of the supply electrical energy provided to the motor 102 to control the speed of the motor 102. The motor 102 may receive an output voltage signal $V_{abc}$ as an input (e.g., which may include $V_a$, $V_b$, and $V_c$). The motor 102 may use the input to generate an amount of current $I_{abc}$ as output (e.g., which may include $I_a$, $I_b$, and $I_c$) that may be equal to the commanded current or vary from the commanded current (e.g., when there is a current harmonic).

The current $I_{abc}$ output from the motor 102 may be sensed by the current sensor 110 to determine a measured current. The current estimator 118 may receive the measured current and determine the estimated current $\hat{I}_{dq}$. The current estimator 118 outputs the estimated current $\hat{I}_{dq}$ to the current regulator 114. Accordingly, as depicted a closed-loop is used by the system 100. However, as discussed, in some instances, the measured current may be incorrect due to circuitry degradation, drift, or the like.

The current regulator 114 may receive the estimated current and compare it to the commanded current $I_{dq}^*$. If there is any variation, the current regulator 114 may transmit an output voltage command signal $V_{dq}*$ that will cause the estimated current $\hat{I}_{dq}$ to closely match the commanded current $I_{dq}*$. As such, since the commanded current $I_{dq}*$ is constant (or varying slowly) and the estimated current $\hat{I}_{dq}$ equals the commanded current $I_{dq}*$, then the estimated current $\hat{I}_{dq}$ is also constant. When current harmonic exists in the current measurement system, the current regulator 114 may include a pulsating component in the output voltage command signal $V_{dq}*$.

In some embodiments, and as shown in FIG. 1, the synchronous motor drive system 100 also includes a non-ideal operation detector 122 configured to determine one or more of a resistance imbalance in the motor 102 and/or a current sensing gain error of the current sensor 110. The non-ideal operation detector 122 takes, as an input, the output voltage command signal $V_{dq}*$ from the current regulator 114. The non-ideal operation detector 122 may generate one or more output signals indicating presence and/or characteristics of a resistance imbalance and/or a current sensing gain error.

Figure 2:
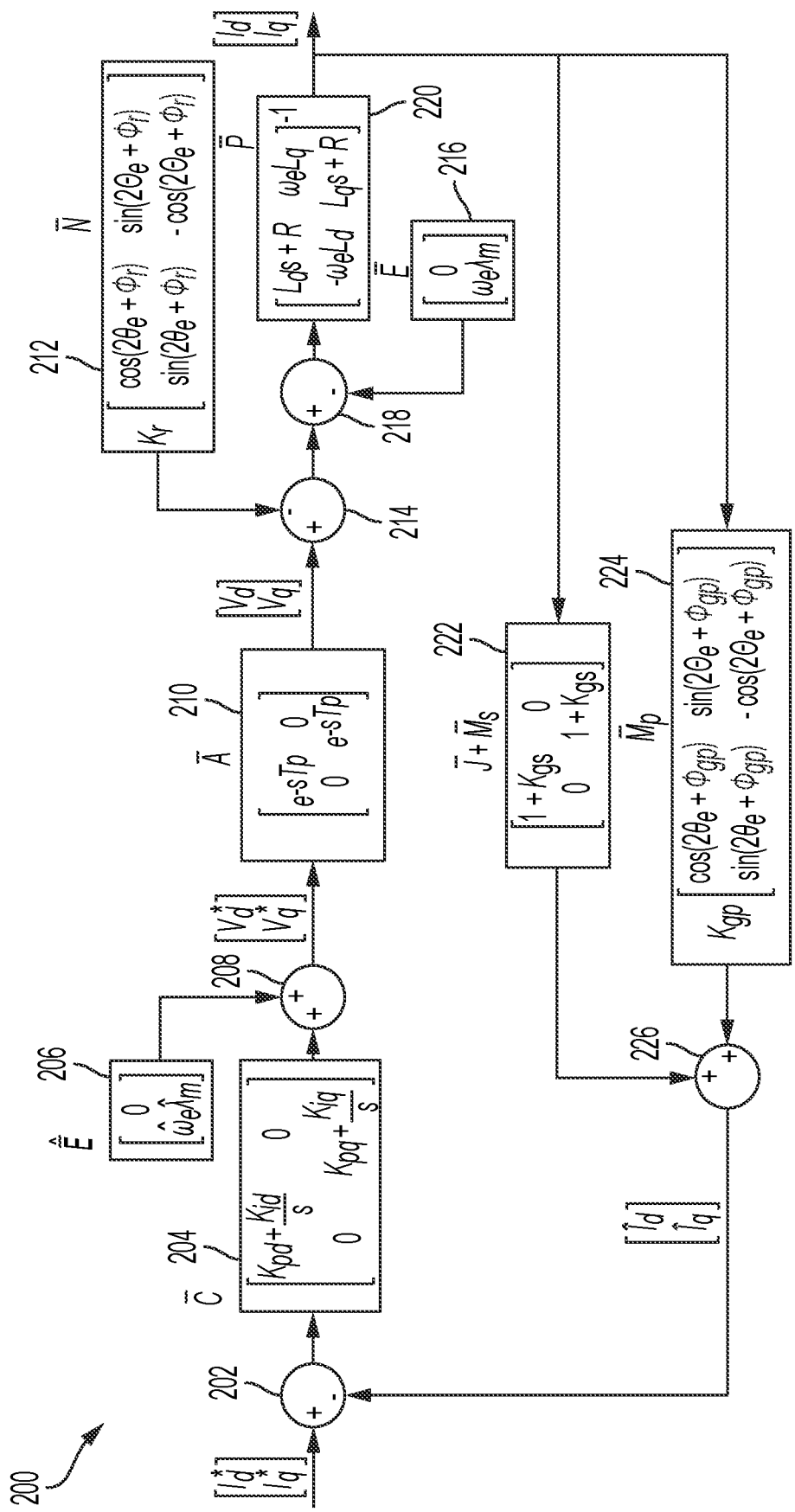
FIG. 2 shows synchronous motor drive system under feedback current control in the presence of both current sensor gain errors and resistance imbalance, according to the principles of the present disclosure.

A mathematical model 200 for closed-loop current control in the presence of both a current gain error and a resistance imbalance is shown in FIG. 2. The mathematical model 200 includes a first subtractor 202 that takes a command current $$\begin{bmatrix} I_d^* \\ I_q^* \end{bmatrix}$$

having direct-axis and quadrature-axis components and which supplies a difference signal to a forward path current controller 204, which is also labeled $\overline{C}$. The forward path current controller 204 may implement a transfer function $\overline{C}(s)$, which may be defined as:

$$\overline{C}(s) = \begin{bmatrix} K_{pd} + \dfrac{K_{id}}{s} & 0 \\ 0 & K_{pq} + \dfrac{K_{iq}}{s} \end{bmatrix}$$

The mathematical model 200 also includes a BEMF compensator 206, also labeled $\hat{E}$ that generates a back-EMF compensation voltage signal that compensates for back-EMF generated in the motor 102. The BEMF compensator 206 may generate the back-EMF compensation voltage signal with direct-axis and quadrature-axis components, and which may be defined as:

$$\begin{bmatrix} 0 \\ \hat{\omega}_e \hat{\lambda}_m \end{bmatrix}.$$

The mathematical model 200 also includes a first adder 208 that adds an output of the forward path current controller 204 to the back-EMF compensation voltage signal to produce a voltage command signal $$\begin{bmatrix} V_d^* \\ V_q^* \end{bmatrix}$$

having direct-axis and quadrature-axis components and which represents a voltage command for the inverter 104.

The mathematical model 200 also includes an inverter model 210, also labeled $\overline{A}$, and which computes an actual voltage signal $$\begin{bmatrix} V_d \\ V_q \end{bmatrix}$$

based on the voltage command signal $$\begin{bmatrix} V_d^* \\ V_q^* \end{bmatrix},$$

and which models a delay caused by operation of the inverter 104. The voltage generation model 210 may be defined as:

$$\begin{bmatrix} e^{-sT_p} & 0 \\ 0 & e^{-sT_p} \end{bmatrix},$$

where $T_p$ represents a propagation delay.

The mathematical model 200 also includes a plant model 212, 214, 216, 218, 220 which, together, model the operation of the motor 102 to determine an actual current signal $$\begin{bmatrix} I_d \\ I_q \end{bmatrix}$$

based on the actual voltage signal $$\begin{bmatrix} V_d \\ V_q \end{bmatrix}.$$

The plant model 212, 214, 216, 218, 220 includes a resistance imbalance model 212, also called $\overline{N}$, and which generates a signal representing noise due to an imbalance in the resistances of the stator windings of the motor 102. The resistance imbalance model 212 may be defined as:

$$K_r \begin{bmatrix} \cos(2\theta_e + \phi_r) & \sin(2\theta_e + \phi_r) \\ \sin(2\theta_e + \phi_r) & -\cos(2\theta_e + \phi_r) \end{bmatrix},$$

where $K_r$ is a magnitude of resistance imbalance and $\phi_r$ is a resistance imbalance angle that represents an angle of the resistance imbalance error, and which may be used to indicate one or more specific stator windings having a resistance imbalance. The plant model 212, 214, 216, 218, 220 also includes a second subtractor 214 that subtracts an output of the resistance imbalance model 212 from the actual voltage signal $$\begin{bmatrix} V_d \\ V_q \end{bmatrix}.$$

The plant model 212, 214, 216, 218, 220 also includes a BEMF model 216 that models back-EMF effects of the motor 102. The BEMF model 216 may be defined as:

$$\begin{bmatrix} 0 \\ \omega_e \lambda_m \end{bmatrix}.$$

The plant model 212, 214, 216, 218, 220 also includes a third subtractor 218 that subtracts an output of the BEMF model 216 from the output of the second subtractor 214.

The plant model 212, 214, 216, 218, 220 also includes a plant winding model 220, which is also labeled $\overline{P}$. The plant winding model 220 takes, as an input, the output of the third subtractor 218 and computes the actual current signal $$\begin{bmatrix} I_d \\ I_q \end{bmatrix}.$$

The plant winding model 220 may implement a transfer function $\overline{P}(s)$, which may be defined as:

$$\overline{P}(s) = \begin{bmatrix} L_d s + R & \omega_e L_q \\ -\omega_e L_d & L_q s + R \end{bmatrix}^{-1}.$$

The mathematical model 200 also includes a current measurement model 222, 224, 226 which, together, model the operation of the current sensor to determine a measured current signal $$\begin{bmatrix} \hat{\imath}_d \\ \hat{\imath}_q \end{bmatrix}$$

based on the actual current signal $$\begin{bmatrix} I_d \\ I_q \end{bmatrix}.$$

The current measurement model 222, 224, 226 includes a position-independent model 222, which is also labeled J+ $\overline{M}_s$. The position-independent sensor model 222 takes the actual current signal $$\begin{bmatrix} I_d \\ I_q \end{bmatrix}$$

and computes a position-independent measured current signal, which does not vary with the position of the motor 102. The position-independent sensor model 222 may be defined as:

$$\begin{bmatrix} 1 + K_{gs} & 0 \\ 0 & 1 + K_{gs} \end{bmatrix}.$$

The current measurement model 222, 224, 226 also includes a position-dependent sensor model 224, which is also labeled $\overline{M}_p$. The position-dependent sensor model 224 takes the actual current signal $$\begin{bmatrix} I_d \\ I_q \end{bmatrix}$$

and computes a position-dependent measured current signal, which varies with the position of the motor 102. The position-dependent sensor model 224 may be defined as:

$$K_{gp} \begin{bmatrix} \cos(2\theta_e + \phi_{gp}) & \sin(2\theta_e + \phi_{gp}) \\ \sin(2\theta_e + \phi_{gp}) & -\cos(2\theta_e + \phi_{gp}) \end{bmatrix},$$

and which uses the phase of error due to current sensing gain errors $\phi_{gp}$, to indicate one or more specific phases having a current measurement error. The current measurement model 222, 224, 226 also includes a second adder 226 that adds the position-independent measured current signal and the position-dependent measured current signal from the position-independent sensor model 222 and the position-dependent sensor model 224, respectively, to produce the measured current signal $$\begin{bmatrix} \hat{\imath}_d \\ \hat{\imath}_q \end{bmatrix}.$$

Figure 3:
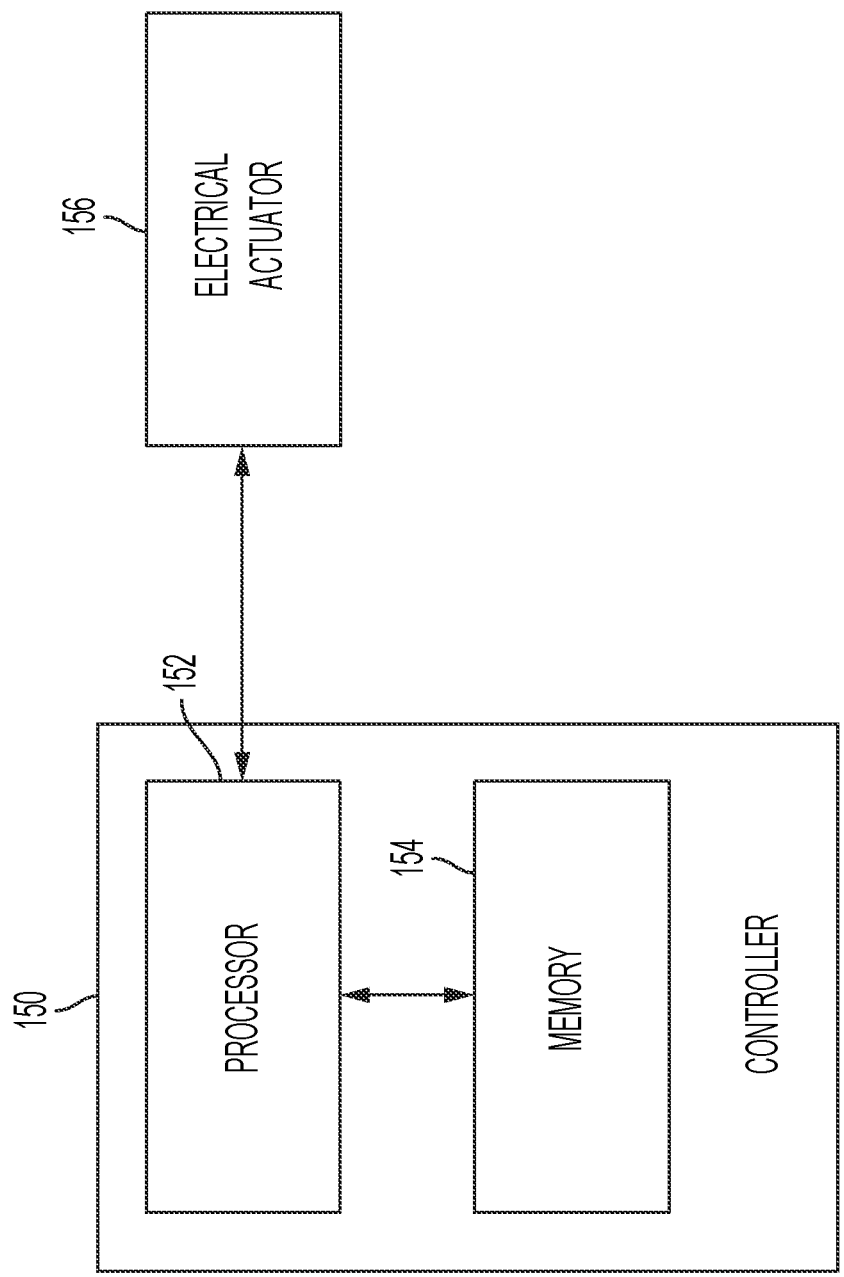
FIG. 3 shows a block diagram showing hardware components of an electric motor drive system, according to aspects of the present disclosure.

In some embodiments, the system of the present disclosure may include a controller 150, as is generally illustrated in FIG. 3. The controller 150 may include any suitable controller, such as an electronic control unit or other suitable controller. The controller 150 may be configured to control, for example, the various functions of the steering system and/or various functions of a vehicle. The controller 150 may include a processor 152 and a memory 154. The processor 152 may include any suitable processor, such as those described herein. Additionally, or alternatively, the controller 150 may include any suitable number of processors, in addition to or other than the processor 152. The memory 154 may comprise a single disk or a plurality of disks (e.g., hard drives), and includes a storage management module that manages one or more partitions within the memory 154. In some embodiments, memory 154 may include flash memory, semiconductor (solid state) memory or the like. The memory 154 may include Random Access Memory (RAM), a Read-Only Memory (ROM), or a combination thereof. The memory 154 may include instructions that, when executed by the processor 152, cause the processor 152 to, at least, control various aspects of the vehicle. Additionally, or alternatively, the memory 154 may include instructions that, when executed by the processor 152, cause the processor 152 to perform functions associated with the systems and methods described herein.

The controller 150 may be operably connected to an electrical actuator 156. The electrical actuator 156 may include the motor 102 and the inverter 104. The controller 150 may be configured to command the inverter to drive the motor 102 to rotate at a given speed or to produce a given amount of torque. The controller 150 may receive one or more signals from electrical actuator 156, such as signals indicating voltages applied to the motor 102. In some embodiments, the electrical actuator 156 may include the position sensor 108, which may be configured to measure a rotational position of the motor 102. Alternatively or additionally, the electrical actuator 156 may include the current sensor 110, which may measure phase currents of one or more conductors between the inverter 104 and the motor 102. In some embodiments, the electrical actuator 156 may include one or more other sensors, such as one or more torque sensors or devices, one or more handwheel position sensors or devices, one or more motor position sensor or devices, one or more position sensors or devices, other suitable sensors or devices, or a combination thereof.

In some embodiments, the controller 150 may perform the methods described herein. However, the methods described herein as performed by the controller 150 are not meant to be limiting, and any type of software executed on a controller or processor can perform the methods described herein without departing from the scope of this disclosure. For example, a controller, such as a processor executing software within a computing device, can perform the methods described herein.

In order to understand and differentiate between and in-turn to develop and implement appropriate detection and mitigation techniques in a stable manner, it is informative to develop a detailed mathematical model of the simultaneous occurrence of both a current measurement gain error and a resistance imbalance.

Analytical Modeling—Resistance Imbalance

A mathematical model for resistance imbalance in PMSMs in the synchronous or dq reference frame is given in equation set (1):

$$V = P^{-1} I + E + NI \quad (1)$$

$$\begin{bmatrix} V_d \\ V_q \end{bmatrix} = \begin{bmatrix} L_d s + R & \omega_e L_q \\ -\omega_e L_d & L_q s + R \end{bmatrix} \begin{bmatrix} I_d \\ I_q \end{bmatrix} +$$

$$\begin{bmatrix} 0 \\ \omega_e \lambda_m \end{bmatrix} + K_r \begin{bmatrix} \cos(2\theta_e + \phi_r) & \sin(2\theta_e + \phi_r) \\ \sin(2\theta_e + \phi_r) & -\cos(2\theta_e + \phi_r) \end{bmatrix} \begin{bmatrix} I_d \\ I_q \end{bmatrix}$$

$$K_r = \frac{1}{3}\sqrt{\sum_x \Delta R_x^2 - \sum_x \sum_y \Delta R_x \Delta R_y} \quad \phi_r = \tan^{-1}\left(\sqrt{3}\frac{+\Delta R_b - \Delta R_c}{2\Delta R_a - \Delta R_b - \Delta R_c}\right)$$

where V represents an actual voltage applied to stator windings of the motor 102, which may also be written as $$\begin{bmatrix} V_d \\ V_q \end{bmatrix};$$

$P^{-1}$ is the inverse plant model; I is the actual current signal, which may also be written as $$\begin{bmatrix} I_d \\ I_q \end{bmatrix};$$

E is a BEMF model that represents voltage generated by back-EMF in the motor 102; N is a noise transfer function, which describes the effect of imbalance in phase resistances in the motor 102; $L_d$ and $L_q$ are the direct-axis and quadrature-axis inductances, respectively; R is a nominal winding resistance of the motor 102, $\omega_e$ is an electrical rotational speed, s is a derivative operator, which may be discretized based on a control loop implementation; $\omega_e$ and $\theta_e$ are the electrical velocity and electrical position, respectively, $\lambda_m$ is the PM flux linkage, $K_r$ represents a magnitude of error in the voltage command due to phase resistance imbalance; $\phi_r$ represents a phase of the error injected due to imbalance in phase resistances; $\Delta R_x$ represents the deviation (imbalance) of resistance of phase x from the nominal winding resistance R of the motor 102; and $\Delta R_y$ represents the deviation (imbalance) of resistance of phase y from the nominal winding resistance R of the motor 102. The subscripts x, y, and z may refer to phases a, b, and c of the motor 120, respectively.

Analytical Modeling—Current Measurement Gain (Scaling) Errors

The measured motor phase currents with only gain errors in current measurement (i.e. without any phase resistance imbalance) may be written as follows:

$$I_{am} = (1 + \Delta K_{ga})I_a$$

$$I_{bm} = (1 + \Delta K_{gb})I_b$$

$$I_{cm} = (1 + \Delta K_{gc})I_c$$

where $I_x$ and $I_{xm}$ represent the actual and measured currents for phase x while $\Delta K_{gx}$ represents the gain error in measurement.

Synchronous frame current estimates in terms of the actual motor currents for gain error $K_{gx}$ for phase x are modeled as provided in equation set (2):

$$\hat{I} = (J + M_s + M_p)I \rightarrow I = (M_s^i + M_p^i)\hat{I} \quad (2)$$

$$J = \begin{bmatrix} 1 & 0 \\ 0 & 1 \end{bmatrix} \quad M_s = \begin{bmatrix} K_{gs} & 0 \\ 0 & K_{gs} \end{bmatrix}$$

$$M_p = K_{gp}\begin{bmatrix} \cos(2\theta_e + \phi_{gp}) & \sin(2\theta_e + \phi_{gp}) \\ \sin(2\theta_e + \phi_{gp}) & -\cos(2\theta_e + \phi_{gp}) \end{bmatrix}$$

$$M_s^i = \frac{1}{\Delta_g}\begin{bmatrix} 1 + K_{gs} & 0 \\ 0 & 1 + K_{gs} \end{bmatrix}$$

$$M_p^i = \frac{K_{gp}}{\Delta_g}\begin{bmatrix} -\cos(2\theta_e + \phi_{gp}) & -\sin(2\theta_e + \phi_{gp}) \\ -\sin(2\theta_e + \phi_{gp}) & \cos(2\theta_e + \phi_{gp}) \end{bmatrix}$$

$$K_{gp} = \frac{1}{3}\sqrt{\sum_x \Delta K_{gx}^2 - \sum_x \sum_y \Delta K_{gx}\Delta K_{gy}}$$

$$\phi_{gp} = \tan^{-1}\left(\frac{\sqrt{3}(-\Delta K_{gb} + \Delta K_{gc})}{2\Delta K_{ga} - \Delta K_{gb} - \Delta K_{gc}}\right)$$

$$K_{gs} = \frac{\Delta K_{ga} + \Delta K_{gb} + \Delta K_{gc}}{3}$$

$$\Delta_g = (1 + K_{gs})^2 - K_{gp}^2 = 1 + \frac{2}{3}\sum_x \Delta K_{gx} + \frac{1}{3}\sum_x \sum_y \Delta K_{gx}\Delta K_{gy}$$

where $\hat{I}$ is the measured dq current matrix; I is the actual dq current matrix, $\phi_{gp}$ represents a phase of error due to current sensing gain errors; $K_{gp}$ represents a magnitude of error due to current sensing gain errors; and $M_s^i$ and $M_p^i$ are inverse matrices of $M_s$ and $M_p$, respectively.

Combined Analysis

When feedback current regulation is used, the current measurement gain error and the resistance imbalance modulate and manifest themselves in a (mathematically) complex manner in different signals. Assuming high bandwidth current regulation is employed, the estimated current may be approximated to be equal to the commanded currents to obtain the actual currents as given in equation set (3):

$$\hat{I} = I^* \rightarrow I = (\overline{M_s^i} + \overline{M_1^i})I^* \quad (3)$$

where $\hat{I}$ is the estimated current, $\bar{I}^*$ is the current command, $\bar{I}$ is the actual current, $\overline{M}_s^i$ is a transfer matrix for a static (i.e. position-independent) term, and $\overline{M}_s^i$ is a transfer matrix for a position-dependent term.

The voltage commands, which may be assumed to be equal to the actual voltage signal may be computed as shown in equation (4):

$$\overline{V}^* \approx \overline{V} = \overline{P}^{-1}(\overline{M}_s^i + \overline{M}_p^i)\bar{I}^* + \overline{E} + \overline{N}(\overline{M}_s^i + \overline{M}_p^i)\bar{I}^* \qquad (4)$$

where $\overline{V}^*$ is the voltage command, $\overline{V}$ is the actual voltage applied to the windings of the motor 102, $\overline{P}^{-1}$ is the inverse plant model, $\overline{E}$ is the BEMF model 216, and $\overline{N}$ is the noise transfer function due to resistance imbalance model 212.

Expanding equation (4), the voltage signal may be segregated into three separate terms as shown in equation set (5):

$$V = V_{DC} + V_\theta + V_{\theta\omega} \qquad (5)$$

$$V_{DC} = (P^{-1}M_s^i + NM_p^i)I^* + E = \frac{1}{\Delta_g}\left((1+K_{gs})\begin{bmatrix} R & \omega_e L_q \\ -\omega_e L_d & R \end{bmatrix} + \right.$$

$$\left. K_r K_{gp}\begin{bmatrix} -\cos(\phi_{gp}-\phi_r) & -\sin(\phi_{gp}-\phi_r) \\ +\sin(\phi_{gp}-\phi_r) & -\cos(\phi_{gp}-\phi_r) \end{bmatrix}\right)\begin{bmatrix} I_d^* \\ I_q^* \end{bmatrix} + \begin{bmatrix} 0 \\ \omega_e \lambda_m \end{bmatrix}$$

$$V_\theta = NM_s^i I^* = \frac{K_r(1+K_{gs})}{\Delta_g}\begin{bmatrix} \cos(2\theta_e+\phi_r) & \sin(2\theta_e+\phi_r) \\ \sin(2\theta_e+\phi_r) & -\cos(2\theta_e+\phi_r) \end{bmatrix}\begin{bmatrix} I_d^* \\ I_q^* \end{bmatrix}$$

$$V_{\theta\omega} = P^{-1}M_p^i I^* = \frac{K_{gp}}{\Delta_g}\begin{bmatrix} -R\cos(2\theta_e+\phi_{gp})+ & -R\sin(2\theta_e+\phi_{gp})- \\ \omega_e L\sin(2\theta_e+\phi_{gp}) & \omega_e L\cos(2\theta_e+\phi_{gp}) \\ -R\sin(2\theta_e+\phi_{gp})- & R\cos(2\theta_e+\phi_{gp})- \\ \omega_e L\cos(2\theta_e+\phi_{gp}) & \omega_e L\sin(2\theta_e+\phi_{gp}) \end{bmatrix}\begin{bmatrix} I_d^* \\ I_q^* \end{bmatrix}$$

where $V_{DC}$ is a constant voltage term, $V_\theta$ is a position-dependent voltage term that varies with the position $\theta$ of the motor 102, $V_{\theta\omega}$ is a position and speed-dependent voltage term that varies with both the position $\theta$ and the speed $\omega$ of the motor 102, and $\Delta_g$ is defined in equation set (2).

Demodulating the Ripple Content in Voltage Equations:

By demodulating the dq voltage waveforms, the pulsating components that are unique to imbalance and current measurement gain errors may be segregated. An inverse frame transformation from the synchronous frame to the 2-phase stationary frame with the appropriate frequency of two per electrical revolution is employed as set forth in equation set (6):

$$\begin{bmatrix} V_u \\ V_v \end{bmatrix} = \begin{bmatrix} \cos 2\theta_e & \sin 2\theta_e \\ \sin 2\theta_e & -\cos 2\theta_e \end{bmatrix}\begin{bmatrix} V_d \\ V_q \end{bmatrix} \qquad (6)$$

$$V_u = \frac{K_r(1+K_{gs})}{\Delta_g}[\cos(\phi_r)I_d^* + \sin(\phi_r)I_q^*] +$$

$$\frac{K_{gp}}{\Delta_g}[-R\cos(\phi_{gp})I_d^* - R\sin(\phi_{gp})I_q^*] + \frac{K_{gp}}{\Delta_g}[\omega_e L\sin(\phi_{gp})I_d^* - \omega_e L\cos(\phi_{gp})I_q^*]$$

$$V_v = \frac{K_r(1+K_{gs})}{\Delta_g}[-\sin(\phi_r)I_d^* + \cos(\phi_r)I_q^*] +$$

$$\frac{K_{gp}}{\Delta_g}[R\sin(\phi_{gp})I_d^* - R\cos(\phi_{gp})I_q^*] + \frac{K_{gp}}{\Delta_g}[\omega_e L\sin(\phi_{gp})I_d^* + \omega_e L\cos(\phi_{gp})I_q^*]$$

where $V_u$ and $V_v$ are demodulated diagnostic voltages, and $\theta_e$ is the electrical position.

Fault Detection Strategy

Based on equation set (6), a resistance imbalance flag A and a current gain error flag B are defined, as set forth in equation set (7):

$$A = \frac{K_r(1+K_{gs})}{\Delta_g}, B = \frac{K_{gp}}{\Delta_p} \qquad (7)$$

$$V_u = [A\cos(\phi_r) - BR\cos(\phi_{gp}) + B\omega_e L\sin(\phi_{gv})]I_d^* +$$

$$[A\sin(\phi_r) - BR\sin(\phi_{gp}) - B\omega_e L\cos(\phi_{gv})]I_q^*$$

$$V_v = [-A\sin(\phi_r) + BR\cos(\phi_{gp}) + B\omega_e L\cos(\phi_{gp})]I_d^* +$$

$$[A\cos(\phi_r) - BR\cos(\phi_{gp}) + B\omega_e L\sin(\phi_{gp})]I_q^*$$

The resistance imbalance flag A and the current gain error flag Beach provide for a corresponding error to be individually identified. The resistance imbalance flag A has a non-zero value in response to a resistance imbalance in the motor 102 and is unaffected by a current sensing gain error, and the current gain error flag B has a non-zero value in response to a current sensing gain error and is unaffected by a resistance imbalance in the motor 102.

To determine the type of errors in the system, the system and method of the present disclosure considers two operating conditions, one at low speed $\omega_{m1}$ and one at high speed $\omega_{m2}$.

At very low speed $\omega_{m1}=\omega_{e1}$ (i.e. in a first region where the motor 102 produces a torque that is invariant of speed), the direct-axis current command $I_{d1}^*=0$, and first demodulated voltages $V_{u1}$, $V_{v1}$ corresponding to the first speed $\omega_{e1}$ may be defined by equation set (8):

$$V_{u1} = [A\sin(\phi_r) - BR\sin(\phi_{gp}) - B\omega_{e1}L\cos(\phi_{gp})]I_{q1}^* \qquad (8)$$

$$V_{v1} = [A\cos(\phi_r) - BR\cos(\phi_{gp}) + B\omega_{e1}L\sin(\phi_{gp})]I_{q1}^*$$

where $\omega_{m1}$ represents a first mechanical motor speed and $\omega_{e1}$ is a corresponding first electrical motor speed. Usually in torque speed curves, torque is plotted as a function of mechanical speed, whereas in equations both mechanical and electrical speed terms may be used. The conversion is $\omega_e$=number of pole pairs*$\omega_m$.

At high speed $\omega_{m2}=\omega_{e2}$ (i.e. a higher speed than the first mechanical motor speed $\omega_{m1}$ and which has a direct-axis current command $I_{d2}^*=0$), and second demodulated voltages $V_{u2}$, $V_{v2}$ corresponding to the second speed $\omega_{e2}$ may be defined by equation set (9)

$$V_{u2} = [A\sin(\phi_r) - BR\sin(\phi_{gp}) - B\omega_{e2}L\cos(\phi_{gp})]I_{q2}^* \qquad (9)$$

$$V_{v2} = [A\cos(\phi_r) - BR\cos(\phi_{gp}) + B\omega_{e2}L\sin(\phi_{gp})]I_{q2}^*$$

Solving the four equations of equation sets (8) and (9) provides values for each of the four unknown variables (i.e. resistance imbalance flag A, current gain error flag B, current gain error angle $\phi_{gp}$, and resistance imbalance angle $\phi_r$), as set forth in equation set (10):

$$\phi_{gp} = \tan^{-1}\left(\frac{\frac{V_{v2}}{I_{q2}^*} - \frac{V_{v1}}{I_{q1}^*}}{\frac{V_{u1}}{I_{q1}^*} - \frac{V_{u2}}{I_{q2}^*}}\right) \qquad (10)$$

-continued $$B = \frac{\sqrt{\left(\frac{V_{u2}}{I_{q2}^*} - \frac{V_{u1}}{I_{q1}^*}\right)^2 + \left(\frac{V_{v2}}{I_{q2}^*} - \frac{V_{v1}}{I_{q1}^*}\right)^2}}{(\omega_{e2} - \omega_{e1})L}$$

$$A = \sqrt{\left(\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})\right)^2 + \left(\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})\right)^2}$$

$$\phi_r = \tan^{-1}\left(\frac{\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})}{\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})}\right)$$

Once values are determined for the resistance imbalance flag A and the current gain error flag B, a type of the error can be determined based on Table 1, below:

TABLE 1

| Resistance Imbalance Flag A | Current Gain Error Flag B | Type of Error |
| --- | --- | --- |
| 0 | 0 | No Error |
| Non-Zero | 0 | Resistance Imbalance Error |
| 0 | Non-Zero | Current Sensing Gain Error |
| Non-Zero | Non-Zero | Both Resistance Imbalance and Current Sensing Gain Errors |

As indicated in Table 1, a value of zero for both of the resistance imbalance flag A and the current gain error flag B indicates presence of neither a resistance imbalance error nor a current gain error. A non-zero value of the resistance imbalance flag A, and a zero value of the current gain error flag B indicates presence of only a resistance imbalance error. A zero value of the resistance imbalance flag A, and a non-zero value of the current gain error flag B indicates presence of only a current gain error. A non-zero value of the resistance imbalance flag A, and a non-zero value of the current gain error flag B indicates presence of both a resistance imbalance error and a current gain error.

Figure 4:
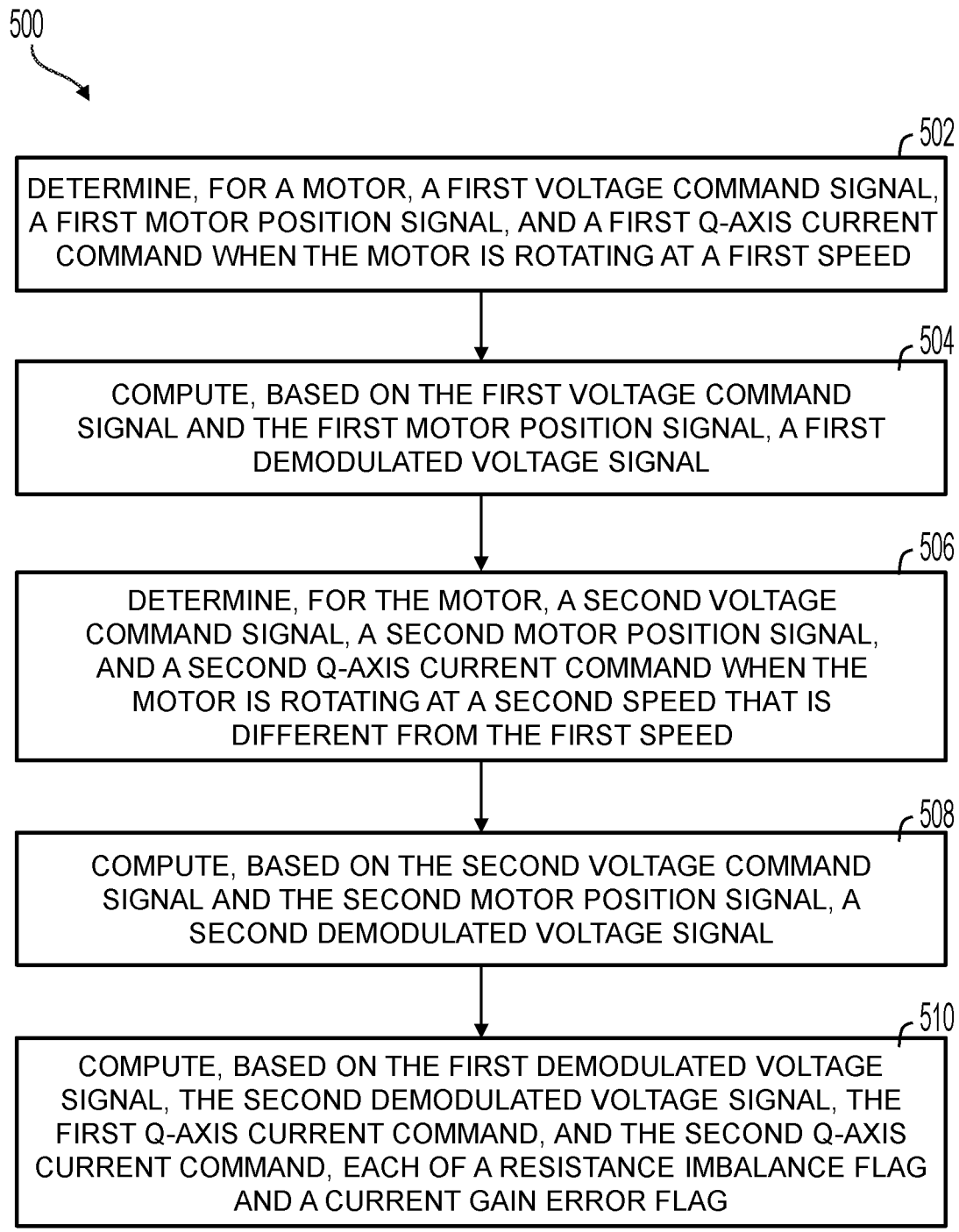
FIG. 4 is a flow diagram generally illustrating a method for detecting and distinguishing a current measurement gain error and a resistance imbalance in a motor drive system, according to the principles of the present disclosure.

FIG. 4 is a flow diagram generally illustrating a method 500 for detecting and distinguishing a current measurement gain error and a resistance imbalance in a motor drive system, according to the principles of the present disclosure. The method 500 may be performed as part of a dedicated fault diagnosis procedure. Alternatively, the steps of the method 500 may be performed during normal operation of a vehicle or other system.

At 502, the method 500 determines, for a motor, a first voltage command signal, a first motor position signal, and a first quadrature-axis current command when the motor is rotating at a first speed. For example, the processor 152 may execute instructions to implement the current regulator 114 to compute the first voltage command $V_d^*$, $V_q^*$ when the motor 102 is rotating at the first speed $\omega_{m1}$. The controller 150 may also determine the first motor position signal $\theta_1$. For example, the processor 152 may execute instructions to implement the position estimator 116 to determine the first motor position signal $\theta_1$ based on the estimated position $\hat{\theta}_e$ when the motor 102 is rotating at the first speed $\omega_{m1}$. In some embodiments, the processor 152 may execute instructions to cause the controller 150 to command the inverter 104 to drive the motor 102 to rotate at the first speed $\omega_{m1}$, which is a relatively low speed. In cases where the method 500 is performed during normal operation, the system may wait until the motor 102 is operated to rotate at the first speed $\omega_{m1}$, and only then perform the subsequent steps that depend on the motor 102 being driven at the first speed $\omega_{m1}$.

At 504 the method 500 computes, based on the first voltage command signal and the first motor position signal, a first demodulated voltage signal. For example, the processor 152 may execute instructions to compute the first demodulated voltage signal $V_{u1}$, $V_{v1}$ based on the first motor position signal $\theta_e$, and the corresponding first voltage command signal $V_{d1}$, $V_{q1}$, and based on the equation:

$$\begin{bmatrix} V_{u1} \\ V_{v1} \end{bmatrix} = \begin{bmatrix} \cos 2\theta_e & \sin 2\theta_e \\ \sin 2\theta_e & -\cos 2\theta_e \end{bmatrix} \begin{bmatrix} V_{d1} \\ V_{q1} \end{bmatrix},$$

as set forth in equation set (7).

At 506 the method 500 determines, for the motor, a second voltage command signal, a second motor position signal, and a second quadrature-axis current command when the motor is rotating at a second speed that is different from the first speed. For example, the processor 152 may execute instructions to implement the current regulator 114 to determine the voltage command $V_d^*$, $V_q^*$ when the motor 102 is rotating at the second speed $\omega_{m2}$. The controller 150 may also determine the second motor position signal $\theta_2$. For example, the processor 152 may execute instructions to implement the position estimator 116 to determine the second motor position signal $\theta_2$ based on the estimated position $\hat{\theta}_e$ when the motor 102 is rotating at the second speed $\omega_{m2}$. In some embodiments, the processor 152 may execute instructions to selectively command the inverter 104 to drive the motor 102 to rotate at the second speed $\omega_{m2}$, which is higher than the first speed $\omega_{m1}$. In cases where the method 500 is performed during normal operation, the system may wait until the motor 102 is commanded to rotate at the second speed $\omega_{m2}$, and only then perform the subsequent steps that depend on the motor 102 being driven at the first speed $\omega_{m2}$.

At 508 the method 500 computes, based on the second voltage command signal and the second motor position signal, a second demodulated voltage signal. For example, the processor 152 may execute instructions to compute the second demodulated voltage signal $V_{u2}$, $V_{v2}$ based on the second motor position signal $\theta_e$, and the corresponding second voltage command signal $V_{d2}$, $V_{q2}$, based on the equation:

$$\begin{bmatrix} V_{u2} \\ V_{v2} \end{bmatrix} = \begin{bmatrix} \cos 2\theta_e & \sin 2\theta_e \\ \sin 2\theta_e & -\cos 2\theta_e \end{bmatrix} \begin{bmatrix} V_{d2} \\ V_{q2} \end{bmatrix},$$

as set forth in equation set (7).

At 510 the method 500 computes, based on the first demodulated voltage signal, the second demodulated voltage signal, the first quadrature-axis current command, and the second quadrature-axis current command, each of a resistance imbalance flag and a current gain error flag. The resistance imbalance flag has a non-zero value in response to a resistance imbalance in the motor and is unaffected by a current sensing gain error, and the current gain error flag has a non-zero value in response to a current sensing gain error and is unaffected by a resistance imbalance in the motor. For example, the processor 152 may execute instructions to solve each of the four equations of equation sets (9) and (10) to calculate the values for each of: the resistance imbalance flag A, the current gain error flag B, the current gain error angle $\phi_{gp}$, and the resistance imbalance angle $\phi_r$.

The present disclosure provides a method for detecting and distinguishing a current measurement gain error and a resistance imbalance in a motor drive system. The method includes: determining, for a motor, a first voltage command signal, a first motor position signal, and a first quadrature-axis current command when the motor is rotating at a first speed; computing, based on the first voltage command signal and the first motor position signal, a first demodulated voltage signal; determining a second voltage command signal, a second motor position signal, and a second quadrature-axis current command when the motor is rotating at a second speed that is different from the first speed; computing, based on the second voltage command signal and the second motor position signal, a second demodulated voltage signal; and computing, based on the first demodulated voltage signal, the second demodulated voltage signal, the first quadrature-axis current command, and the second quadrature-axis current command, each of a resistance imbalance flag and a current gain error flag. In some embodiments, the resistance imbalance flag has a non-zero value in response to a resistance imbalance in the motor and is unaffected by a current sensing gain error, and the current gain error flag has a non-zero value in response to a current sensing gain error and is unaffected by a resistance imbalance in the motor.

In some embodiments, the first speed corresponds to the motor producing a torque that is invariant of speed, and the second speed is greater than the first speed and corresponds to a d-axis current command $I_d^* = 0$.

In some embodiments, each of the first demodulated voltage signal and the second demodulated voltage signal includes two components $V_u$, $V_v$ which are computed as:

$$\begin{bmatrix} V_u \\ V_v \end{bmatrix} = \begin{bmatrix} \cos 2\theta_e & \sin 2\theta_e \\ \sin 2\theta_e & -\cos 2\theta_e \end{bmatrix} \begin{bmatrix} V_d \\ V_q \end{bmatrix}$$

where $\theta_e$ is a corresponding one of the first motor position signal or the second motor position signal representing an electrical position of the motor, and $V_d$, $V_q$ are direct-axis and quadrature-axis components of a corresponding one of the first voltage command signal or the second voltage command signal.

In some embodiments, computing the resistance imbalance flag includes calculating the resistance imbalance flag in accordance with an equation:

$$A = \sqrt{\left(\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})\right)^2 + \left(\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})\right)^2}$$

where A is the resistance imbalance flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

In some embodiments, computing the current gain error flag includes calculating the current gain error flag in accordance with an equation:

$$B = \frac{\sqrt{\left(\frac{V_{u2}}{I_{q2}^*} - \frac{V_{u1}}{I_{q1}^*}\right)^2 + \left(\frac{V_{v2}}{I_{q2}^*} - \frac{V_{v1}}{I_{q1}^*}\right)^2}}{(\omega_{e2} - \omega_{e1})L}$$

where B is the current gain error flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, and, L is a nominal synchronous inductance of the motor.

In some embodiments, the method further includes: computing, based on the first demodulated voltage signal, the second demodulated voltage signal, the first quadrature-axis current command, and the second quadrature-axis current command, a current gain error angle; and in some embodiments, the current gain error angle indicates a particular one or more current sensors having a current sensing gain error.

In some embodiments, computing the current gain error angle includes calculating the current gain error angle in accordance with an equation:

$$\phi_{gp} = \tan^{-1}\left(\frac{\frac{V_{v2}}{I_{q2}^*} - \frac{V_{v1}}{I_{q1}^*}}{\frac{V_{u1}}{I_{q1}^*} - \frac{V_{u2}}{I_{q2}^*}}\right)$$

where $\phi_{gp}$ is the current gain error angle, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, and $I_{q2}^*$ is the second quadrature-axis current command when the motor is rotating at the second speed $\omega_{e2}$.

In some embodiments, the method further includes computing, based on the first demodulated voltage signal, the second demodulated voltage signal, the first quadrature-axis current command, and the second quadrature-axis current command, a resistance imbalance angle, and in some embodiments the resistance imbalance angle indicates a particular one or more windings of the motor having a resistance imbalance.

In some embodiments, computing the resistance imbalance angle includes calculating the resistance imbalance angle in accordance with an equation:

$$\phi_r = \tan^{-1}\left(\frac{\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})}{\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})}\right)$$

where $\phi_r$ is the resistance imbalance angle, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

The present disclosure provides an electronic controller. The electronic controller includes a processor; and a memory that includes instructions. The instructions, when executed by the processor, cause the processor to: determine, for a motor, a first voltage command signal, a first motor position signal, and a first quadrature-axis current command when the motor is rotating at a first speed; compute, based on the first voltage command signal and the first motor position signal, a first demodulated voltage signal; determine a second voltage command signal, a second motor position signal, and a second quadrature-axis current command when the motor is rotating at a second speed that is different from the first speed; compute, based on the second voltage command signal and the second motor position signal, a second demodulated voltage signal; and compute, based on the first demodulated voltage signal, the second demodulated voltage signal, the first quadrature-axis current command, and the second quadrature-axis current command, each of a resistance imbalance flag and a current gain error flag. In some embodiments, the resistance imbalance flag has a non-zero value in response to a resistance imbalance in the motor and is unaffected by a current sensing gain error, and the current gain error flag has a non-zero value in response to a current sensing gain error and is unaffected by a resistance imbalance in the motor.

In some embodiments, the first speed corresponds to the motor producing a torque that is invariant of speed, and the second speed is greater than the first speed and corresponds to a d-axis current command equal In some embodiments, each of the first demodulated voltage signal and the second demodulated voltage signal includes two components $V_u$, $V_v$ which are computed as:

$$\begin{bmatrix} V_u \\ V_v \end{bmatrix} = \begin{bmatrix} \cos2\theta_e & \sin2\theta_e \\ \sin2\theta_e & -\cos2\theta_e \end{bmatrix} \begin{bmatrix} V_d \\ V_q \end{bmatrix}$$

where $\theta_e$ is a corresponding one of the first motor position signal or the second motor position signal representing an electrical position of the motor, and $V_d$, $V_q$ are direct-axis and quadrature-axis components of a corresponding one of the first voltage command signal or the second voltage command signal.

In some embodiments, the instructions cause the processor to calculate the resistance imbalance flag in accordance with an equation:

$$A = \sqrt{\left(\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})\right)^2 + \left(\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})\right)^2}$$

where A is the resistance imbalance flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

In some embodiments, the instructions cause the processor to calculate the current gain error flag in accordance with an equation:

$$B = \frac{\sqrt{\left(\frac{V_{u2}}{I_{q2}^*} - \frac{V_{u1}}{I_{q1}^*}\right)^2 + \left(\frac{V_{v2}}{I_{q2}^*} - \frac{V_{v1}}{I_{q1}^*}\right)^2}}{(\omega_{e2} - \omega_{e1})L}$$

where B is the current gain error flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, and, L is a nominal synchronous inductance of the motor.

In some embodiments, the instructions further cause the processor to compute, based on the first demodulated voltage signal, the second demodulated voltage signal, the first quadrature-axis current command, and the second quadrature-axis current command, a current gain error angle; and in some embodiments, the current gain error angle indicates a particular one or more current sensors having a current sensing gain error.

In some embodiments, the instructions cause the processor to calculate the current gain error angle in accordance with an equation:

$$\phi_{gp} = \tan^{-1}\left(\frac{\frac{V_{v2}}{I_{q2}^*} - \frac{V_{v1}}{I_{q1}^*}}{\frac{V_{u1}}{I_{q1}^*} - \frac{V_{u2}}{I_{q2}^*}}\right)$$

where $\phi_{gp}$ is the current gain error angle, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, and $I_{q2}^*$ is the second quadrature-axis current command when the motor is rotating at the second speed $\omega_{e2}$.

In some embodiments, the instructions cause the processor to compute, based on the first demodulated voltage signal, the second demodulated voltage signal, the first quadrature-axis current command, and the second quadrature-axis current command, a resistance imbalance angle; and in some embodiments, the resistance imbalance angle indicates a particular one or more windings of the motor having a resistance imbalance.

In some embodiments, the instructions cause the processor to calculate the resistance imbalance angle in accordance with an equation:

$$\phi_r = \tan^{-1}\left[\frac{\dfrac{V_{u1}}{I_{q1}^*} + \omega_{e1}\left(\dfrac{\dfrac{V_{u2}}{I_{q2}^*} - \dfrac{V_{u1}}{I_{q1}^*}}{\omega_{e1} - \omega_{e2}}\right) + BR\sin(\phi_{gp})}{\dfrac{V_{v1}}{I_{q1}^*} - \omega_{e1}\left(\dfrac{\dfrac{V_{v2}}{I_{q2}^*} - \dfrac{V_{v1}}{I_{q1}^*}}{\omega_{e2} - \omega_{e1}}\right) + BR\cos(\phi_{gp})}\right]$$

where $\phi_r$ is the resistance imbalance angle, $V_{u1}$ and $V_{v1}$ are two components of the first demodulated voltage signal, $V_{u2}$ and $V_{v2}$ are two components of the second demodulated voltage signal, $I_{q1}^*$, is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

The present disclosure provides a system for detecting and distinguishing a current measurement gain error and a resistance imbalance in a motor drive system. The system includes: an inverter operably connected to a motor, and a controller operably connected to the inverter. The controller is configured to: determine, for a motor, a first voltage command signal, a first motor position signal, and a first quadrature-axis current command when the motor is rotating at a first speed; compute, based on the first voltage command signal and the first motor position signal, a first demodulated voltage signal; determine a second voltage command signal, a second motor position signal, and a second quadrature-axis current command when the motor is rotating at a second speed that is different from the first speed; compute, based on the second voltage command signal and the second motor position signal, a second demodulated voltage signal; and compute, based on the first demodulated voltage signal, the second demodulated voltage signal, the first quadrature-axis current command, and the second quadrature-axis current command, each of a resistance imbalance flag and a current gain error flag. In some embodiments, the resistance imbalance flag has a non-zero value in response to a resistance imbalance in the motor and is unaffected by a current sensing gain error, and the current gain error flag has a non-zero value in response to a current sensing gain error and is unaffected by a resistance imbalance in the motor.

In some embodiments, the first speed corresponds to the motor producing a torque that is invariant of speed, and the second speed is greater than the first speed and corresponds to a d-axis current command substantially equal to zero.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for detecting and distinguishing a current measurement gain error and a resistance imbalance in a motor drive system, the method comprising:
   determining, for a motor, a first voltage command signal, a first motor position signal, and a first quadrature-axis current command, when the motor is rotating at a first speed;
   computing, based on the first voltage command signal and the first motor position signal, a first demodulated voltage signal;
   determining a second voltage command signal, a second motor position signal, and a second quadrature-axis current command when the motor is rotating at a second speed that is different than the first speed;
   computing, based on the second voltage command signal and the second motor position signal, a second demodulated voltage signal; and
   computing, based on the first demodulated voltage signal, the second demodulated voltage signal, the first quadrature-axis current command, and the second quadrature-axis current command, each of a resistance imbalance flag and a current gain error flag,
   wherein the resistance imbalance flag has a non-zero value in response to a resistance imbalance in the motor and is unaffected by a current sensing gain error, and
   wherein the current gain error flag has a non-zero value in response to a current sensing gain error and is unaffected by a resistance imbalance in the motor.

2. The method of claim 1, wherein the first speed corresponds to the motor producing a torque that is invariant of speed, and the second speed is greater than the first speed and corresponds to a d-axis current command substantially equal to zero.

3. The method of claim 1, wherein each of the first demodulated voltage signal and the second demodulated voltage signal includes two components $V_u$, $V_v$ which are computed as:

$$\begin{bmatrix} V_u \\ V_v \end{bmatrix} = \begin{bmatrix} \cos 2\theta_e & \sin 2\theta_e \\ \sin 2\theta_e & -\cos 2\theta_e \end{bmatrix} \begin{bmatrix} V_d \\ V_q \end{bmatrix}$$

where $\theta_e$ is a corresponding one of the first motor position signal or the second motor position signal representing an electrical position of the motor, and $V_d$, $V_q$ are direct-axis and quadrature-axis components of a corresponding one of the first voltage command signal or the second voltage command signal.

4. The method of claim 1, wherein computing the resistance imbalance flag includes calculating the resistance imbalance flag in accordance with an equation:

$$A = \sqrt{\left(\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})\right)^2 + \left(\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})\right)^2}$$

where A is the resistance imbalance flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

5. The method of claim 1, wherein computing the current gain error flag includes calculating the current gain error flag in accordance with an equation:

$$B = \frac{\sqrt{\left(\frac{V_{u2}}{I_{q2}^*} - \frac{V_{u1}}{I_{q1}^*}\right)^2 + \left(\frac{V_{v2}}{I_{q2}^*} - \frac{V_{v1}}{I_{q1}^*}\right)^2}}{(\omega_{e2} - \omega_{e1})L}$$

where B is the current gain error flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, and, L is a nominal synchronous inductance of the motor.

6. The method of claim 1, further comprising:
   computing, based on the first demodulated voltage signal, the second demodulated voltage signal, the first quadrature-axis current command, and the second quadrature-axis current command, a current gain error angle,
   wherein the current gain error angle indicates a particular one or more current sensors having a current sensing gain error.

7. The method of claim 6, wherein computing the current gain error angle includes calculating the current gain error angle in accordance with an equation:

$$\phi_{gp} = \tan^{-1}\left(\frac{\frac{V_{v2}}{I_{q2}^*} - \frac{V_{v1}}{I_{q1}^*}}{\frac{V_{u1}}{I_{q1}^*} - \frac{V_{u2}}{I_{q2}^*}}\right)$$

where $\phi_{gp}$ is the current gain error angle, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, and $I_{q2}^*$ is the second quadrature-axis current command when the motor is rotating at the second speed $\omega_{e2}$.

8. The method of claim 1, further comprising:
   computing, based on the first demodulated voltage signal, the second demodulated voltage signal, the first quadrature-axis current command, and the second quadrature-axis current command, a resistance imbalance angle,
   wherein the resistance imbalance angle indicates a particular one or more windings of the motor having a resistance imbalance.

9. The method of claim 8, wherein computing the resistance imbalance angle includes calculating the resistance imbalance angle in accordance with an equation:

$$\phi_r = \tan^{-1}\left[\frac{\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})}{\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})}\right]$$

where $\phi_r$ is the resistance imbalance angle, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

10. An electronic controller comprising:
a processor; and
a memory that includes instructions that, when executed by the processor, cause the processor to:
determine, for a motor, a first voltage command signal, a first motor position signal, and a first quadrature-axis current command when the motor is rotating at a first speed;
compute, based on the first voltage command signal and the first motor position signal, a first demodulated voltage signal;
determine a second voltage command signal, a second motor position signal, and a second quadrature-axis current command when the motor is rotating at a second speed that is different from the first speed;
compute, based on the second voltage command signal and the second motor position signal, a second demodulated voltage signal; and
compute, based on the first demodulated voltage signal, the second demodulated voltage signal, the first quadrature-axis current command, and the second quadrature-axis current command, each of a resistance imbalance flag and a current gain error flag,
wherein the resistance imbalance flag has a non-zero value in response to a resistance imbalance in the motor and is unaffected by a current sensing gain error, and
wherein the current gain error flag has a non-zero value in response to a current sensing gain error and is unaffected by a resistance imbalance in the motor.

11. The electronic controller of claim 10, wherein the first speed corresponds to the motor producing a torque that is invariant of speed, and the second speed is greater than the first speed and corresponds to a d-axis current command substantially equal to zero.

12. The electronic controller of claim 10, wherein each of the first demodulated voltage signal and the second demodulated voltage signal includes two components $V_u$, $V_v$ which are computed as:

$$\begin{bmatrix} V_u \\ V_v \end{bmatrix} = \begin{bmatrix} \cos 2\theta_e & \sin 2\theta_e \\ \sin 2\theta_e & -\cos 2\theta_e \end{bmatrix} \begin{bmatrix} V_d \\ V_q \end{bmatrix}$$

where $\theta_e$ is a corresponding one of the first motor position signal or the second motor position signal representing an electrical position of the motor, and $V_d$, $V_q$ are direct-axis and quadrature-axis components of a corresponding one of the first voltage command signal or the second voltage command signal.

13. The electronic controller of claim 10, wherein the instructions cause the processor to calculate the resistance imbalance flag in accordance with an equation:

$$A = \sqrt{\left(\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})\right)^2 + \left(\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})\right)^2}$$

where A is the resistance imbalance flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

14. The electronic controller of claim 10, wherein the instructions cause the processor to calculate the current gain error flag in accordance with an equation:

$$B = \frac{\sqrt{\left(\frac{V_{u2}}{I_{q2}^*} - \frac{V_{u1}}{I_{q1}^*}\right)^2 + \left(\frac{V_{v2}}{I_{q2}^*} - \frac{V_{v1}}{I_{q1}^*}\right)^2}}{(\omega_{e2} - \omega_{e1})L}$$

where B is the current gain error flag, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, and, L is a nominal synchronous inductance of the motor.

15. The electronic controller of claim 10, wherein the instructions further cause the processor to compute, based on the first demodulated voltage signal, the second demodulated voltage signal, the first quadrature-axis current command, and the second quadrature-axis current command, a current gain error angle,
wherein the current gain error angle indicates a particular one or more current sensors having a current sensing gain error.

16. The electronic controller of claim 15, wherein the instructions cause the processor to calculate the current gain error angle in accordance with an equation:

$$\phi_{gp} = \tan^{-1}\left(\frac{\frac{V_{v2}}{I_{q2}^*} - \frac{V_{v1}}{I_{q1}^*}}{\frac{V_{u1}}{I_{q1}^*} - \frac{V_{u2}}{I_{q2}^*}}\right)$$

where $\phi_{gp}$ is the current gain error angle, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, and $I_{q2}^*$ is the second quadrature-axis current command when the motor is rotating at the second speed $\omega_{e2}$.

17. The electronic controller of claim 10, wherein the instructions cause the processor to compute, based on the first demodulated voltage signal, the second demodulated voltage signal, the first quadrature-axis current command, and the second quadrature-axis current command, a resistance imbalance angle,
wherein the resistance imbalance angle indicates a particular one or more windings of the motor having a resistance imbalance.

18. The electronic controller of claim 17, wherein the instructions cause the processor to calculate the resistance imbalance angle in accordance with an equation:

$$\phi_r = \tan^{-1}\left(\frac{\frac{V_{u1}}{I_{q1}^*} + \omega_{e1}\left(\frac{\frac{V_{u2}}{I_{q2}^*} - \frac{V_{u1}}{I_{q1}^*}}{\omega_{e1} - \omega_{e2}}\right) + BR\sin(\phi_{gp})}{\frac{V_{v1}}{I_{q1}^*} - \omega_{e1}\left(\frac{\frac{V_{v2}}{I_{q2}^*} - \frac{V_{v1}}{I_{q1}^*}}{\omega_{e2} - \omega_{e1}}\right) + BR\cos(\phi_{gp})}\right)$$

where $\phi_r$ is the resistance imbalance angle, $V_{u1}$ and $V_{v1}$ are two components of the first demodulated voltage signal, $V_{u2}$ and $V_{v2}$ are two components of the second demodulated voltage signal, $I_{q1}^*$ is the first quadrature-axis current command when the motor is rotating at the first speed $\omega_{e1}$, $I_{q2}^*$ is the second quadrature-axis current command when the motor is rotating at the second speed $\omega_{e2}$, B is the current gain error flag, R is a nominal winding resistance of the motor, and $\phi_{gp}$ is a current gain error angle.

19. A system for detecting and distinguishing a current measurement gain error and a resistance imbalance in a motor drive system, the system comprising:

a controller configured to:
determine, for a motor, a first voltage command signal, a first motor position signal, and a first quadrature-axis current command when the motor is rotating at a first speed;
compute, based on the first voltage command signal and the first motor position signal, a first demodulated voltage signal;
determine a second voltage command signal, a second motor position signal, and a second quadrature-axis current command when the motor is rotating at a second speed that is different from the first speed;
compute, based on the second voltage command signal and the second motor position signal, a second demodulated voltage signal; and
compute, based on the first demodulated voltage signal, the second demodulated voltage signal, the first quadrature-axis current command, and the second quadrature-axis current command, each of a resistance imbalance flag and a current gain error flag,
wherein the resistance imbalance flag has a non-zero value in response to a resistance imbalance in the motor and is unaffected by a current sensing gain error, and
wherein the current gain error flag has a non-zero value in response to a current sensing gain error and is unaffected by a resistance imbalance in the motor.

20. The system of claim 19, wherein the first speed corresponds to the motor producing a torque that is invariant of speed, and the second speed is greater than the first speed and corresponds to a d-axis current command substantially equal to zero.

* * * * *